United States Patent [19]

Muselli et al.

[11] Patent Number: 5,239,931
[45] Date of Patent: Aug. 31, 1993

[54] AUTOMOTIVE TRUCK WITH ROBOT AND AUTOMATIC BATTERIES REPLACEMENT SYSTEM

[75] Inventors: Roberto Muselli, Piacenza; Armando Neri, Bologna; Gianluigi Orsi, Roveleto di Cadeo PC, all of Italy

[73] Assignees: Jobs S.p.A., Piacenza; G.D. S.p.A., Bologna, both of Italy

[21] Appl. No.: 827,370

[22] Filed: Jan. 29, 1992

[30] Foreign Application Priority Data

Feb. 11, 1991 [IT] Italy .................. PC91 A 000003

[51] Int. Cl.$^5$ .................................................. B61K 1/00
[52] U.S. Cl. ...................................... 104/34; 180/68.5
[58] Field of Search .................. 104/34; 414/343, 222, 414/390, 400, 751, 491, 278; 180/68.5

[56] References Cited

U.S. PATENT DOCUMENTS

| | | | |
|---|---|---|---|
| 3,838,745 | 10/1974 | Kappei | 104/34 |
| 3,876,086 | 4/1975 | Kappei | 104/34 |
| 4,120,411 | 10/1978 | Johnson | 104/34 |
| 4,342,533 | 8/1982 | Hane | 104/34 |
| 4,700,121 | 10/1987 | Neri | 414/278 |
| 4,800,640 | 1/1989 | Miyazaki et al. | 414/222 |

FOREIGN PATENT DOCUMENTS 1525005 9/1980 United Kingdom .................. 104/34

Primary Examiner—Mark T. Le
Attorney, Agent, or Firm—Notaro & Michalos

[57] ABSTRACT

Automotive truck with robot and automatic batteries replacement system, comprising two spaced apart battery charging devices located so that the truck can position itself between them, such devices being equipped with devices (16, 17, 18) apt to remove discharged batteries from one side and insert charged batteries from the opposite side.

7 Claims, 5 Drawing Sheets

AUTOMOTIVE TRUCK WITH ROBOT AND AUTOMATIC BATTERIES REPLACEMENT SYSTEM

FIELD AND BACKGROUND OF THE INVENTION

This invention relates to a robot which is mounted on an automotive truck and is therefore able to move around the workplace along pre-set routes to perform a number of repetitive operations with the precision typical of this kind of machine. The robot is designed in such as way as to reduce its size and increase the range of the movements generally possible for this kind of machine. The automotive truck, replaces the batteries powering it automatically when they are almost discharged.

The result is a fully-automatic unit which moves along programmed routes, stopping to perform the required operations. Many industries use automatic machines, especially robots, to perform repetitive tasks, work in dangerous environments or carry out operations requiring a degree of precision that cannot be achieved manually.

These robots and manipulators are already known as such, but are always used in fixed or semi-fixed positions; at most they are mounted on guides which allow limited movements, generally between two given positions.

Automotive trucks are already known which can automatically follow a number of tracks marked along the route and which can be programmed to decide independently which track to follow, depending on the task to be performed.

For example, some known trucks can follow a track consisting of an underground wire along which a signal travels, while others can optically detect a track drawn on the floor and move along the center of the track.

Such trucks are called AGV's in technical jargon, and this term will be used throughout the remainder of this description. The Italian Patent N. 1.187.369 (U.S. Pat. No. 4,700,121) describes an automatic battery replacement system for a mobile unit equipped with a robot, comprising: a station for the replacement of the batteries; means for positioning the mobile unit with respect to the station; and means for actuating the robot to replace the discharged battery with a new one.

There is a need for this kind of equipment in many industries, such as manufacturing industries and the like, but their construction presents numerous major problems.

For example, it is necessary that the robot can position itself with the required precision; another problem is the difficulty of constructing a robot which is compact enough to be mounted on an AGV of normal size while retaining all the necessary movements and precision.

Another problem is the need for the unit to have sufficient endurance.

SUMMARY OF THE INVENTION

In order to solve this problem, this invention proposes an automotive truck equipped with a robot, in which the unit includes a system designed to replace the batteries automatically when they are almost discharged.

BRIEF DESCRIPTION OF THE DRAWINGS

This invention will now be described in detail, by way of example but not of limitation, with particular reference to the annexed figures in which.

DESCRIPTION OF THE PREFERRED EMBODIMENT

Figure 1:
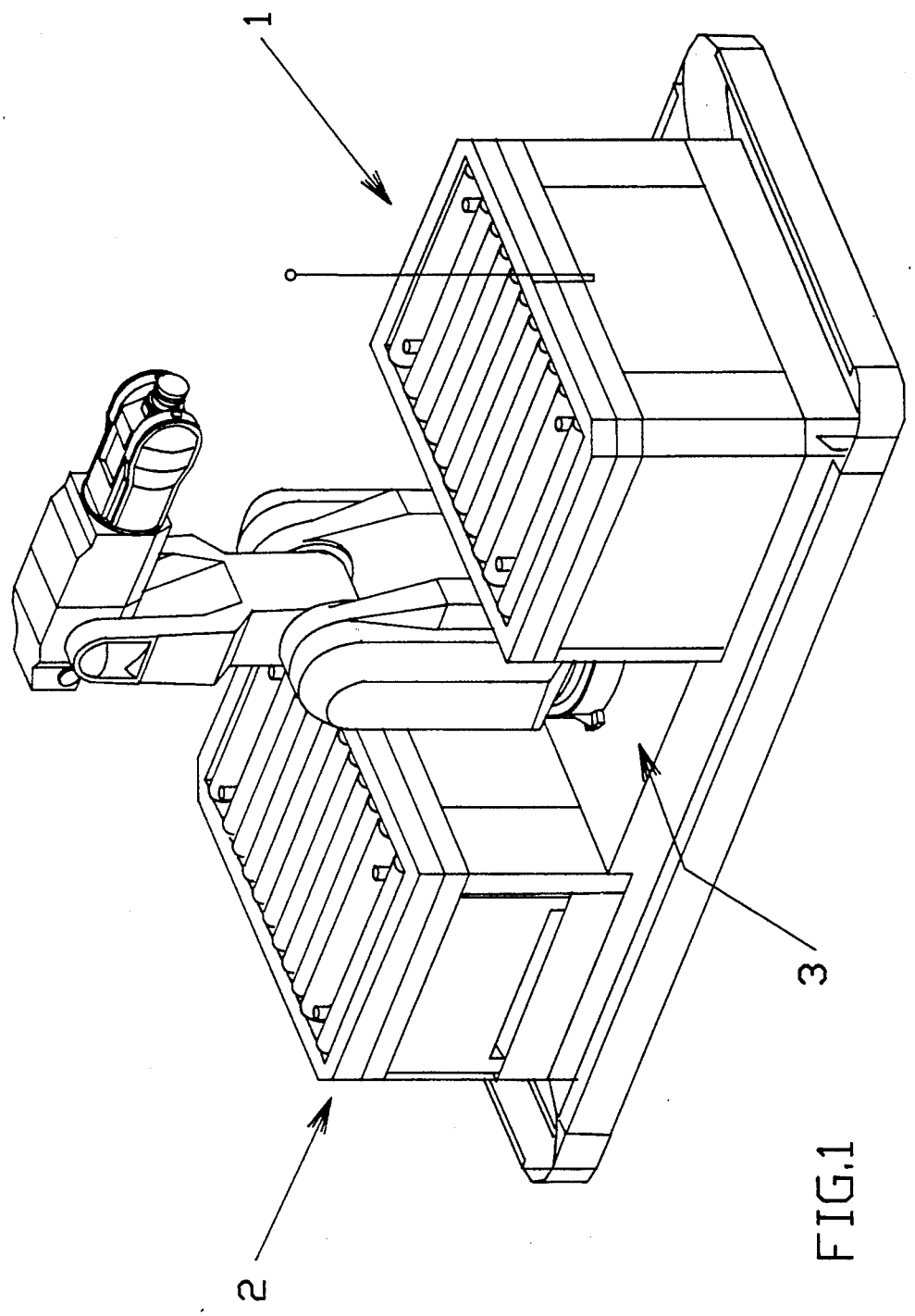
FIG. 1 is a perspective view of the robot mounted on a truck in accordance with the invention.
Figure 2:
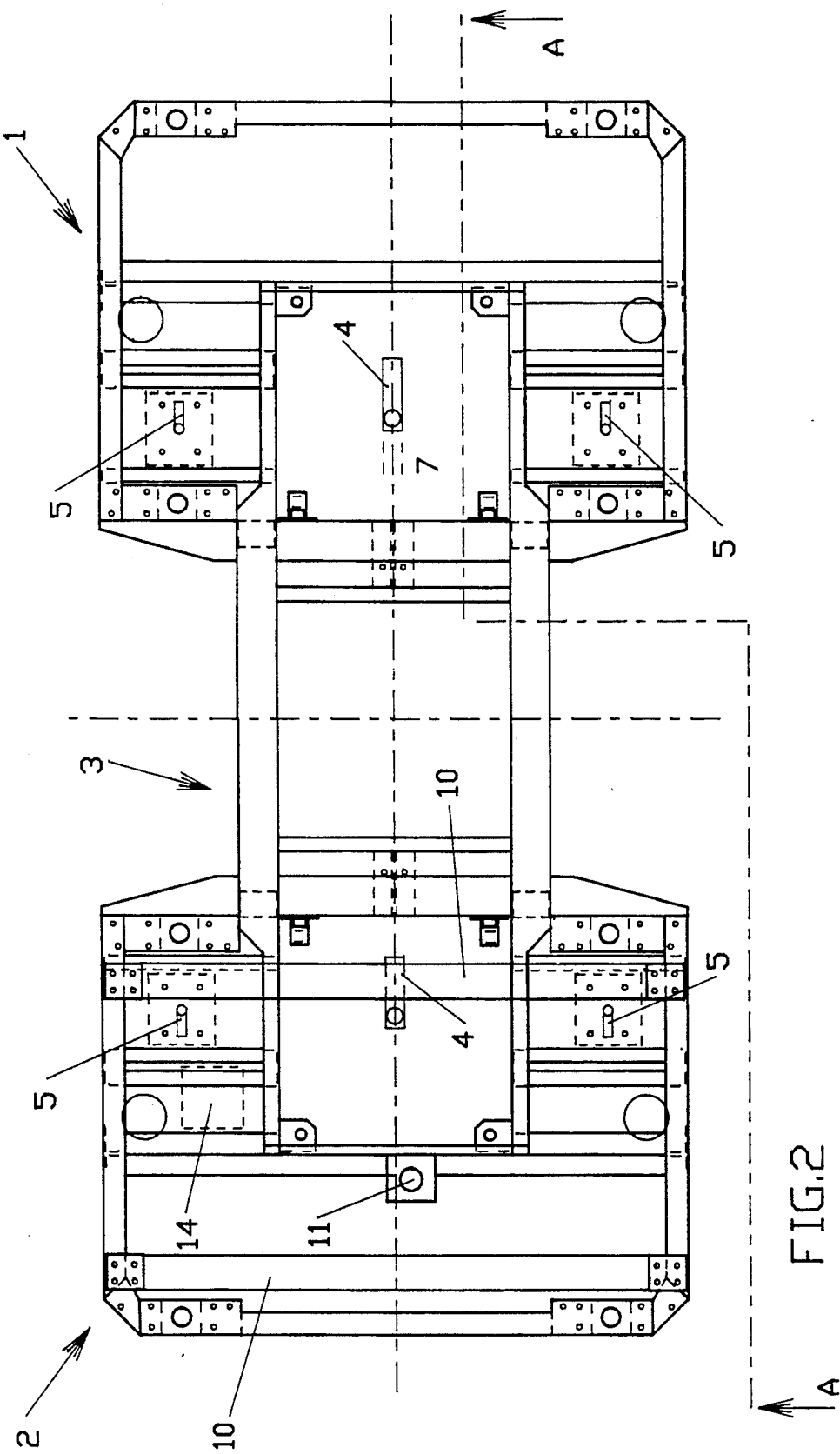
FIG. 2 is a plan view of the AGV chassis.

FIG. 2 shows the AGV chassis which, seen in the plan view, presents two areas marked 1 and 2 respectively; these areas, which house the robot's electronics and the battery unit, are connected by a central section 3 on which the robot is mounted. Central section 3 is narrower than the side sections in order to make the robot's arm more mobile.

The chassis, made of welded steel sections or the like, comprises a pair of drive wheels 4 located in a central position and two pairs of pivoting wheels 5 located on either side of the first two.

The AGV is equipped with interchangeable nickel-cadmium batteries which are automatically replaced when almost discharged. The battery is of a known type. The battery unit is housed in a battery compartment area 2 of the truck.

Figure 3:
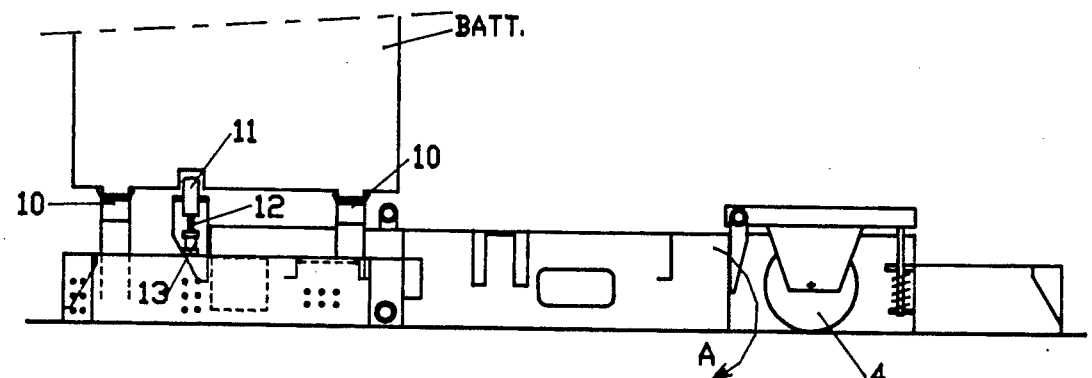
FIG. 3 is a cross-section along line A—A in FIG. 2.
Figure 8:
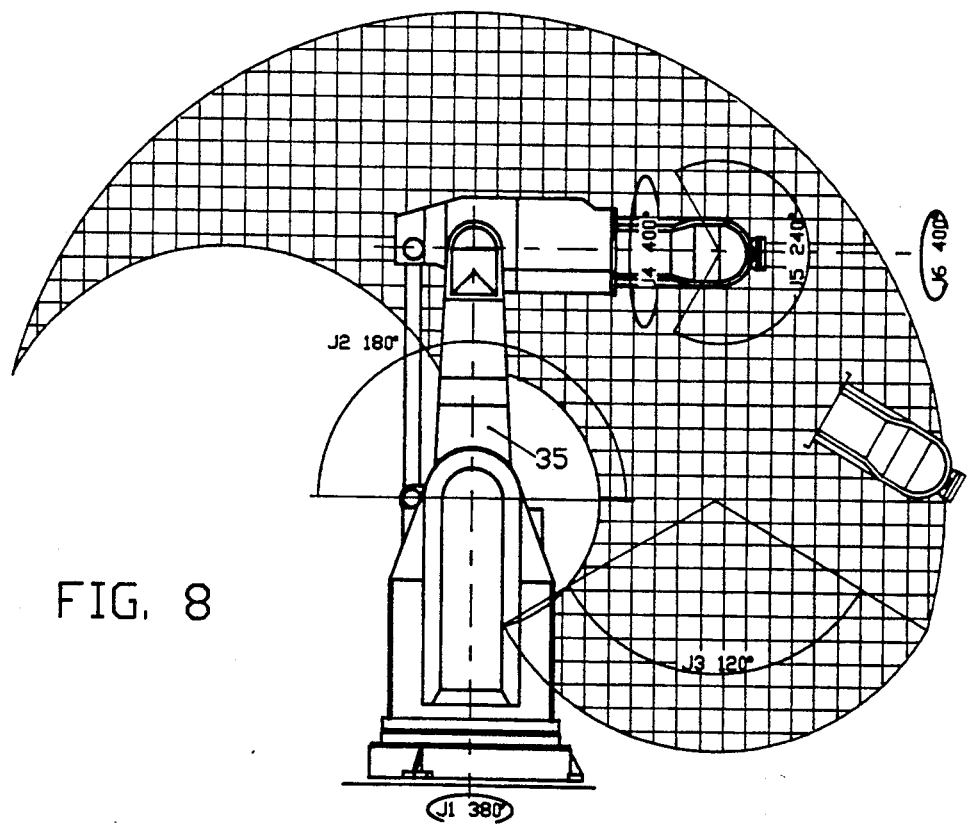
FIG. 8 is a figure indicating the movements of the robot in accordance with the invention.

The battery unit is fitted with wheels which run along guides 10 (FIG. 3) to take the battery to a position where it is secured by a pin 11 which is pushed upwards by a spring 12 or the like to enter a corresponding hole in the battery casing.

A hydraulic piston or the like 13 lowers pin 11 to release the batteries when they are automatically replaced.

Contact plates fitted at the bottom of the batteries engage corresponding brushes 14 on the AGV, also subject to the action of elastic elements which press the contact plates upwards to keep them in contact with the battery electrodes.

Figure 4:
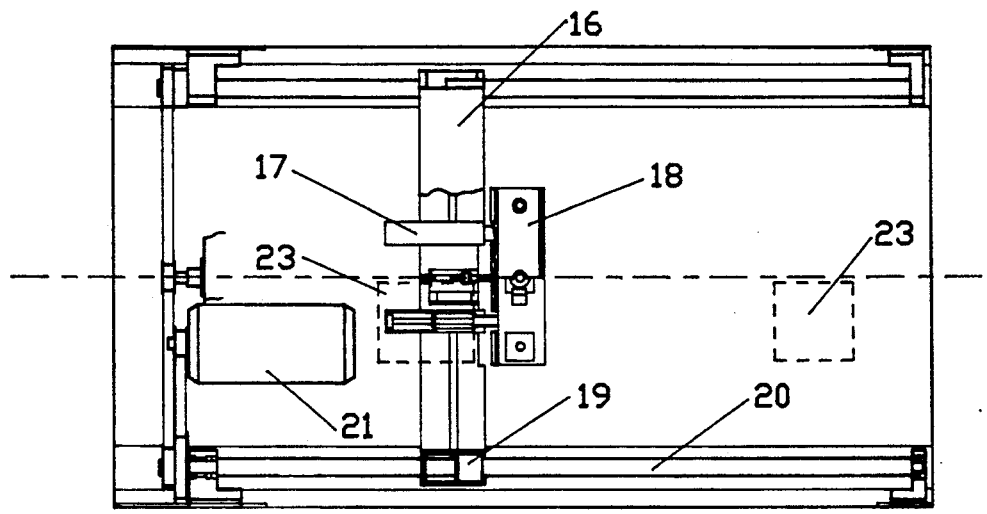
FIGS. 4 and 5 are plan views of the automatic battery replacement devices.
Figure 6:
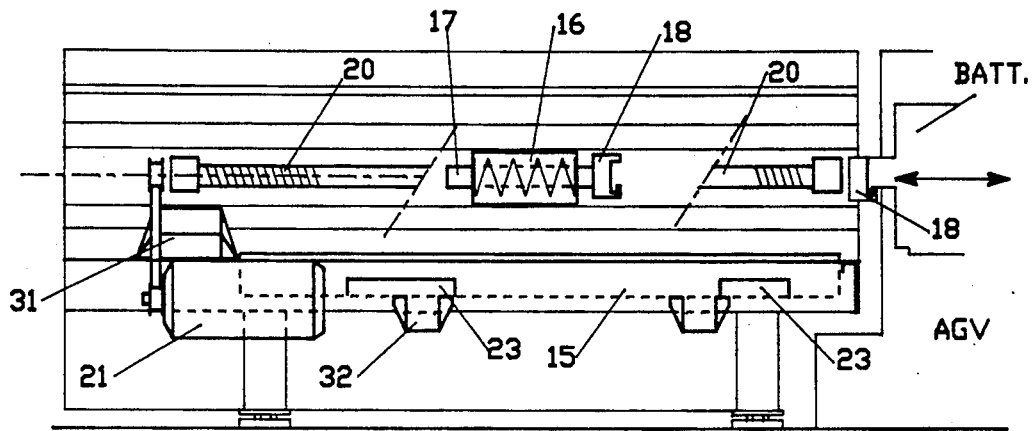
FIG. 6 is a side view of the assembly shown in FIGS. 4 and 5.
Figure 5:
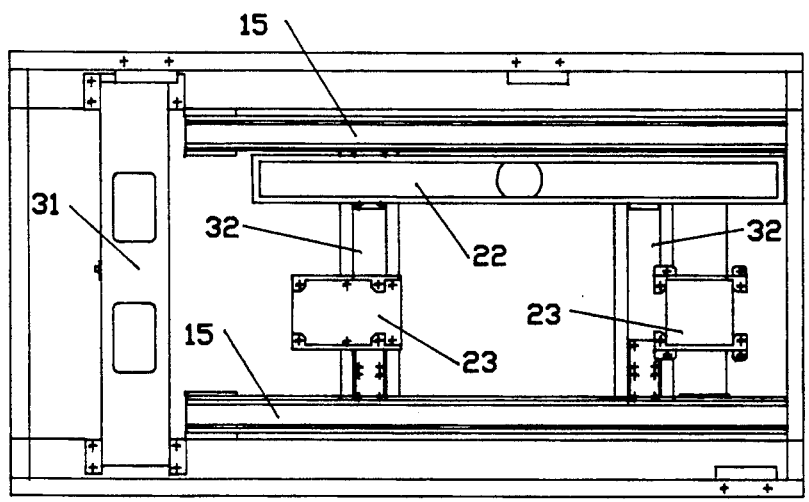

The automatic battery charging and replacement unit, illustrated in FIGS. 4 to 6, comprises a pair of guides 15 located in a position corresponding to guides 10 on the AGV. A crosspiece 16, to which a battery pick-up gripper 18 is fitted with the insertion of shock absorber elements 17, runs along guides 15.

Scrolls 19 which engage recirculating-ball shafts 20 are fitted to the end of crosspiece 16; these shafts are made to rotate around their own axis by a motor 21.

By rotating shafts 20, motor 21 controls the movement of crosspiece 16 and thus the gripper movement in a direction parallel to guides 15.

Under the guides there is an opening 22 connected to equipment not illustrated in the figure which blows fresh air onto the battery unit to cool the batteries.

In the gap between guides 15 there are two plates, each fitted with a battery charging contact unit 23.

As the battery contacts are arranged asymmetrically, two contact units need to be fitted to the charging device to ensure correct connection to the batteries regardless of the direction in which the AGV is facing at the time of replacement.

Figure 7:
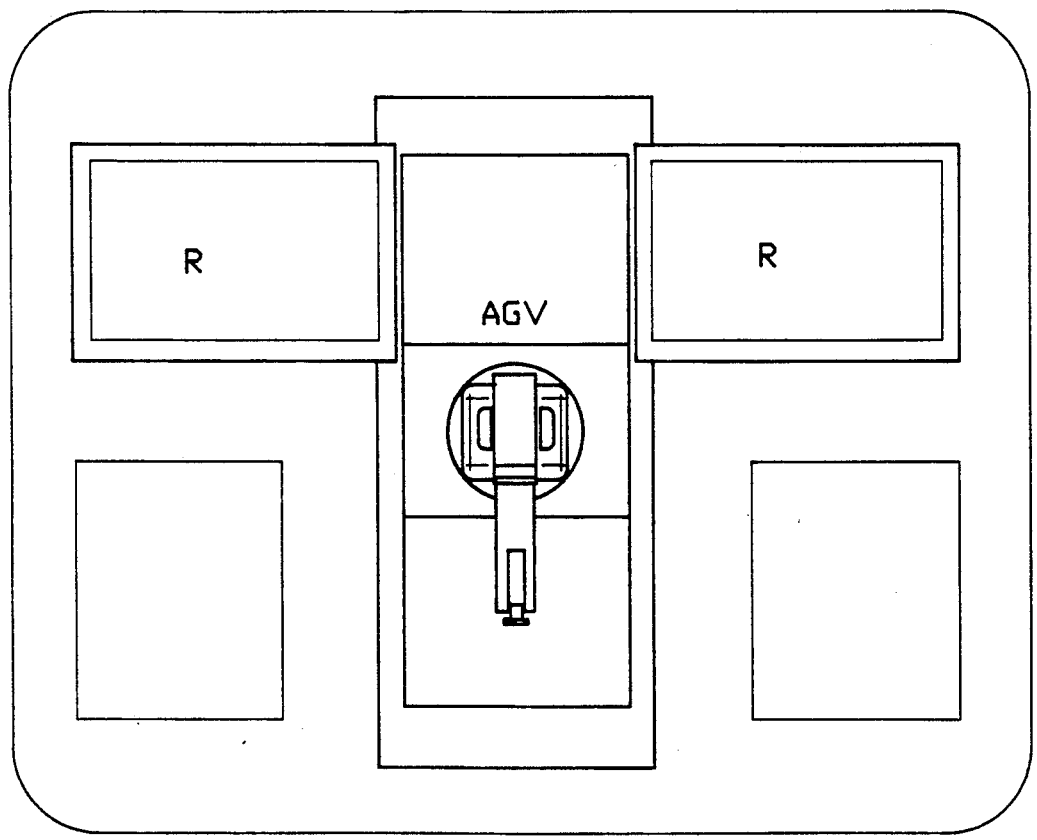
FIG. 7 is a plan view of the battery replacement area with the AGV in position.

There will be two charging units located in such a way as to allow the AGV to position itself between them as shown in FIG. 7.

In this case the discharged battery can be removed from one side and a charged battery inserted from the opposite side.

The truck can also be fitted with wedge-shaped telescopic elements which fit into matching housings located at the working areas in order to guarantee maximum precision of positioning whatever the condition of the ground surface.

When the batteries are almost fully discharged, this situation being signalled by devices of known type, the truck, suitably programmed, moves to the charging area (FIG. 7) where two battery charging units, each indicated by the letter R, are located, and positions itself between them.

So that the AGV can receive a freshly charged battery from the charging unit R on either side and further so that the discharged battery from the AGV can be supplied to the battery charge on the other side, the two battery charging contact assemblies 23,23 shown in FIG. 5, are positioned so that one contact assembly can engage and charge a battery received when the AGV is facing one direction, and the other contact assembly is positioned for receiving the battery contacts when the AGV is facing in the opposite direction. This takes into account the position of the brushes 14 which are offset from the center line of the AGV as shown in FIG. 2, where the fresh battery makes contact with the electronics of the AGV for supplying power.

At this point motor 21 is activated and rotates shafts 20; this causes crosspiece 16 to run along its guides, bringing cushioned gripper 18 into position to pick up the battery on the truck.

The motor is then activated in the opposite direction to remove the discharged battery from the truck; this battery is pulled along guides 15 to the charging position, with the electrodes matching up to one of the plates with electric contacts 23. Fresh air is blown in through opening 22 to cool the battery while it is being charged.

Similar devices simultaneously perform the reverse operation from the opposite side, inserting a charged battery into the truck. Practically continuous use of the robot and truck is thus guaranteed with only one standby battery unit.

An expert in the field could devise numerous modifications and variations which should be deemed to be included in the ambit of this invention.

We claim:

1. In combination with an automotive truck carrying a robot powered by a battery, a battery exchanging arrangement comprising:

a battery replacement area having a passage for receiving the automotive truck when facing in either a first direction along the passage or a second opposite direction along the passage, the battery replacement area including a pair of battery charging devices positioned on opposite sides of the passage;

two contact units spaced apart in each of said battery charging devices, each contact unit being adapted for receiving a contact of a battery to be charged, one of said contact units being positioned to engage a battery contact received from an automotive truck facing in the first direction in the passage and the other of said contact units being positioned to engage a battery contact from an automotive truck facing in the second direction in the passage;

said automotive truck having a battery compartment with brushes located in an offset position with respect to a center line of said automotive truck for engaging battery contacts of the battery to be mounted on the battery compartment;

locking means for locking a battery in the battery compartment; and battery replacement means movably mounted on each of said two battery charging devices and each for gripping a battery in the battery compartment of the automotive truck when the automotive truck is facing in either the first or the second direction and positioned in the passage between the battery charging devices, to remove a battery and place it in one of the battery charging devices with a battery contact engaged with the contact unit of the one battery charging device;

the locking means being operative to release a battery from the battery compartment and whereby nearly discharged batteries from the automotive truck can be supplied to either battery charging device and freshly charged batteries can be received into the automotive truck from either battery charging device regardless of which direction the automotive truck is facing.

2. An arrangement according to claim 1, including a first pair of spaced apart guides in the battery compartment of the automotive truck for guiding a battery for movement into and out of the compartment, said first pair of guides extending transversely to the passage when the automotive truck is in the passage in either the first or the second direction, and a second pair of guides in each of the battery charging devices extending transversely to the passage for receiving and discharging a battery to and from each battery charging device, said first and second pairs of guides being at an equal vertical position when the automotive truck is in the passage.

3. An arrangement according to claim 2, wherein the locking means comprises a pin for engaging a battery, a spring for urging the pin into engagement with the battery and a hydraulic piston for retracting the pin from the battery against the spring.

4. An arrangement according to claim 3, wherein the battery replacement means comprises a crosspiece movably mounted along the second pair of guides and a gripper mounted on the crosspiece for gripping a battery.

5. An arrangement according to claim 4, wherein the battery charging devices each includes a pair of circulating ball actuators extending parallel to the second pair of guides and engaged with the crosspiece for moving the crosspiece parallel to the second pair of guides.

6. An arrangement according to claim 5, wherein each battery charging device includes a housing having an opening for receiving air for cooling the battery charging device.

7. An arrangement according to claim 6, wherein the automotive truck comprises the battery compartment which is wide and positioned at one end of the truck in the first or second direction, an opposite wide compartment positioned at an opposite end of the truck and a narrow central section between the battery compartment and the opposite compartment, the robot being mounted on the narrow central section.

* * * * *